US012794704B2

(12) United States Patent
Rojo Fernández et al.

(10) Patent No.: US 12,794,704 B2
(45) **Date of Patent: *Nov. 10, 2026**

(54) METHOD AND SYSTEM OF STORING SMART CONTRACT EVENTS

(71) Applicant: Mastercard International Incorporated, Purchase, NY (US)

(72) Inventors: Miguel Ángel Rojo Fernández, Dublin (IE); Stephen Higgins, Dublin (IE); Eduardo Andrade, Dublin (IE)

(73) Assignee: Mastercard International Incorporated, Purchase, NY (US)

( * ) Notice: Subject to any disclaimer, the term of this patent is extended or adjusted under 35 U.S.C. 154(b) by 141 days.

This patent is subject to a terminal disclaimer.

(21) Appl. No.: 18/738,211

(22) Filed: Jun. 10, 2024

(65) Prior Publication Data

US 2024/0333523 A1 Oct. 3, 2024

Related U.S. Application Data

(63) Continuation of application No. 17/557,597, filed on Dec. 21, 2021, now Pat. No. 12,034,861.

(51) Int. Cl.

| | |
|---|---|
| ***H04L 29/06*** | (2006.01) |
| ***H04L 9/32*** | (2006.01) |
| ***H04L 67/06*** | (2022.01) |
| ***H04L 67/1097*** | (2022.01) |
| *H04L 9/00* | (2022.01) |

(52) U.S. Cl.

CPC .......... *H04L 9/3247* (2013.01); *H04L 9/3242* (2013.01); *H04L 9/3297* (2013.01); (Continued)

(58) Field of Classification Search

CPC ..................................................... H04L 9/3247

See application file for complete search history.

(56) References Cited

U.S. PATENT DOCUMENTS

| | | | |
|---|---|---|---|
| 2019/0066079 A1* | 2/2019 | Liu | G06K 19/06037 |
| 2019/0236559 A1 | 8/2019 | Padmanabhan | |

(Continued)

FOREIGN PATENT DOCUMENTS

| | | |
|---|---|---|
| JP | 2020038568 A | 3/2020 |
| JP | 2020160526 A | 10/2020 |

OTHER PUBLICATIONS

Habic Bogdan: "How to set up Real-time Alerting for Smart Contracts with Tenderly." Provided NPL by applicants. Aug. 15, 2019.*

(Continued)

*Primary Examiner* — Jason K Gee

(74) *Attorney, Agent, or Firm* — PANITCH SCHWARZE BELISARIO & NADEL LLP

(57) ABSTRACT

A method for distributing event data for smart contracts executed on a blockchain to subscribing systems includes: collecting, by a processor of a blockchain node in a blockchain network, a set of event data emitted by a smart contract executed on a blockchain associated with the blockchain network; identifying, by the processor of the blockchain node, communication data for one or more subscriber computing systems; and after a predetermined period of time, transmitting, by a transmitter of the blockchain node, the collected event data to each of the one or more subscriber computing systems using the communication data.

16 Claims, 5 Drawing Sheets

(52) U.S. Cl.
CPC .......... *H04L 67/06* (2013.01); *H04L 67/1097* (2013.01); *H04L 9/50* (2022.05)

(56) References Cited

U.S. PATENT DOCUMENTS

| | | | | |
|---|---|---|---|---|
| 2020/0005388 | A1 | 1/2020 | Lim et al. | |
| 2021/0012248 | A1 * | 1/2021 | Narang | H04L 9/3297 |
| 2023/0156455 | A1 * | 5/2023 | Salkinzis | H04W 8/18<br>705/75 |

OTHER PUBLICATIONS

International Search Report dated Mar. 6, 2023, corresponding to PCT/2022/052650 (13 pages).

Habic Bogdan: "How to set up Real-time 1-16 alerting for Smart Contracts with Tenderly", 'Sep. 22, 2020 (Sep. 22, 2020), XP093026388, Retrieved from the Internet: URL:https://web.archive.org/web/2020092206 3536/ https://blog.tenderly.co/how-to-set-u p-real-time-alerting-for-smart-contracts-with-tenderly/ [retrieved on Feb. 23, 2023] p. 2-p. 8.

Amit: "Understanding Smart Contract Event Listeners in Web3.js", Sep. 29, 2020 (Sep. 29, 2020), XP093026448, Retrieved from the Internet: URL:https://blockchain.oodles.io/dev-blog/ event-listeners-in-web3-js/ [retrieved on Feb. 23, 2023] p. 1-p. 3.

Notice of Reasons for Refusal mailed May 30, 2025 in corresponding Japanese Patent Application No. 2024-537586 with English Translation (8 pages).

* cited by examiner

100

METHOD AND SYSTEM OF STORING SMART CONTRACT EVENTS

FIELD

The present disclosure relates to distributing event data for smart contracts, specifically collecting event data emitted from a smart contract executed on a blockchain through a function and distributing the collected event data to subscriber system for feeding into handlers for utilizing outside of a blockchain.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also providing anonymity as to the individuals or entities involved in a transaction. One of the more popular aspects of a blockchain is that it is an immutable record: every transaction ever that is part of the chain is stored therein and cannot be changed due to the computational requirements and bandwidth limitations, particularly as a chain gets longer and a blockchain network adds more nodes.

As time went on, participants developed needs that exceeded the basic transfers of digital currency that blockchains were known for. These needs resulted in the development and creation of smart contracts, which are self-executable data objects stored in a blockchain that can automate processes as desired for participants. A common use of a smart contract is escrow. In an example, a smart contract can be created and added to the blockchain that monitors for the addition of an expected new object on the chain, such as a hash of a deed of transfer. When the addition is detected and verified by the contract, the contract can self-execute and submit a new transaction to the blockchain for transfer of digital currency from one party to another as predetermined in the smart contract. The result is automatic payment to the receiving party upon execution of the deed of transfer, such as homeowner getting automatically paid on the blockchain once they transfer deed of ownership of their house to a buyer.

While smart contracts provided additional, useful functionality to users, they can still be limited. Smart contracts can affect a blockchain, such as by submitting new transactions or taking other actions that are traditionally manually done with a blockchain wallet. However, smart contracts are unable to perform any actions outside of the blockchain. Currently, there are no publicly available systems that can perform an action external to a blockchain as a result of activity taking place on the blockchain. Thus, there is a need for such a system, particularly one that is scalable and can be easily adapted to fulfill any needs of an interested user.

SUMMARY

The present disclosure provides a description of systems and methods for distributing event data for smart contracts executed on a blockchain to subscribing systems. Smart contracts that are added to a blockchain can include an emit function. When the smart contract is executed, a detectable event, the emit function will emit data, referred to herein as "event data," whose format and values can be decided on by the writer of the smart contract and can be affected by values on the blockchain itself. A blockchain node monitors for the execution of smart contracts on the blockchain and collects the emitted event data. Interested users can subscribe to a blockchain node, where the blockchain node can regularly distribute all collected event data to its subscribers. A subscriber's system can receive the collected event data and feed the event data to a handler, which can initiate functions external to the blockchain, thus enabling external actions to be taken as a result of activity on the blockchain. By using emit functions and automated distribution to subscribers, any interested user can have any needed data collected by a blockchain node and distributed automatically to them with little modification to existing systems. Additionally, the event data can be of any format and amount to suit the needs of a user, thus being able to fulfill a near limitless number of use cases, vastly increasing the usefulness and capabilities of smart contracts.

A method for distributing event data for smart contracts executed on a blockchain to subscribing systems includes: collecting, by a processor of a blockchain node in a blockchain network, a set of event data emitted by a smart contract executed on a blockchain associated with the blockchain network; identifying, by the processor of the blockchain node, communication data for one or more subscriber computing systems; and after a predetermined period of time, transmitting, by a transmitter of the blockchain node, the collected event data to each of the one or more subscriber computing systems using the communication data.

A system for distributing event data for smart contracts executed on a blockchain to subscribing systems includes: a blockchain network including a blockchain node; and one or more subscriber computing systems, wherein the blockchain node includes a processor collecting a set of event data emitted by a smart contract executed on a blockchain associated with the blockchain network, and identifying communication data for the one or more subscriber computing systems, and a transmitter transmitting, after a predetermined period of time, the collected event data to each of the one or more subscriber computing systems using the communication data.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

System for Utilizing Event Data from Smart Contracts

Figure 1:
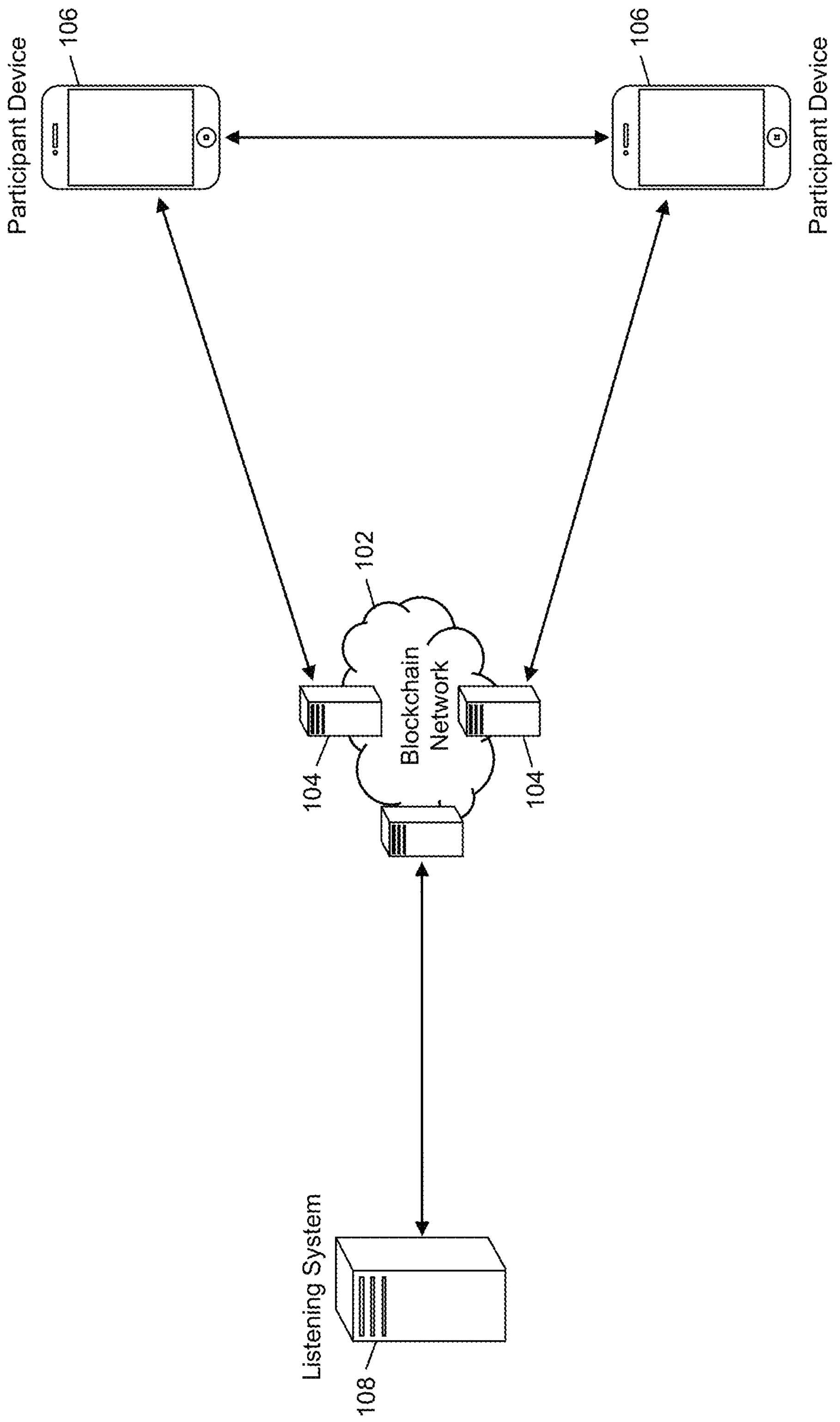
FIG. 1 is a block diagram illustrating a high-level system architecture for distributing and using event data for smart contracts in accordance with exemplary embodiments.

FIG. 1 illustrates a system 100 that distributes event data collected from smart contracts executed on a blockchain for use by other systems outside of the blockchain.

Figure 2:
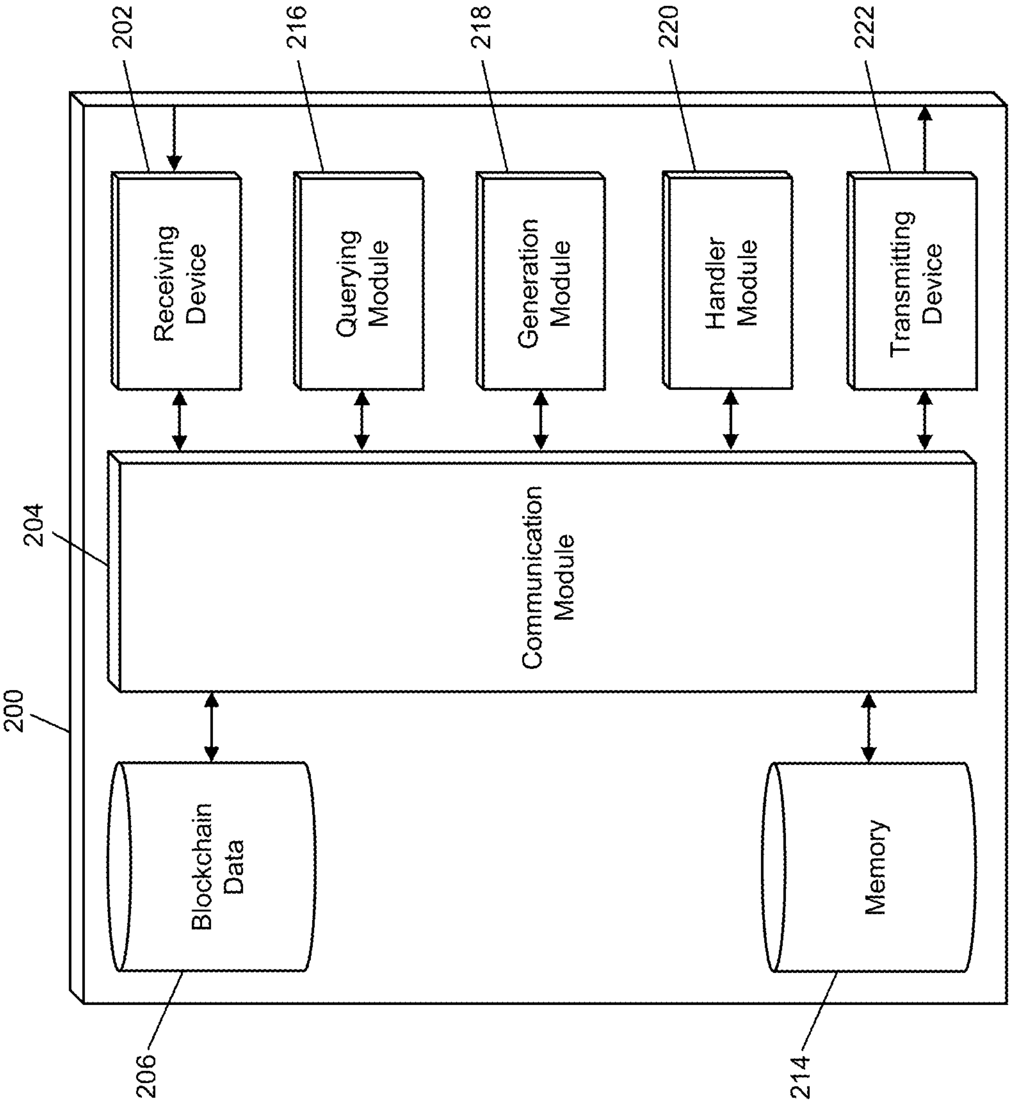
FIG. 2 is a block diagram illustrating computing devices for distributing, collecting, and using event data for smart contracts in the system of FIG. 1 in accordance with exemplary embodiments.
Figure 5:
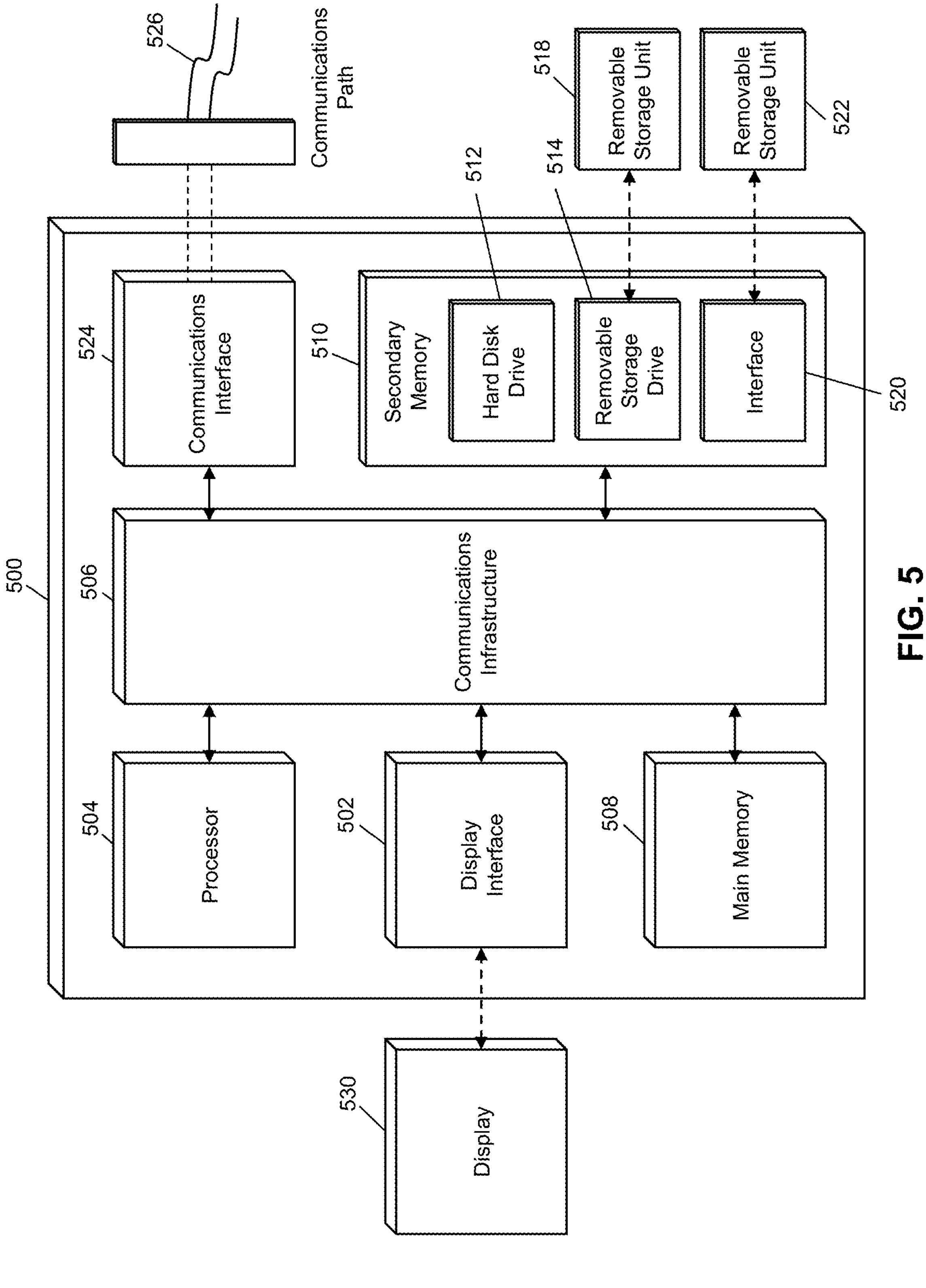
FIG. 5 is a block diagram illustrating a computer system architecture in accordance with exemplary embodiments.

The system 100 can include a blockchain network 102. The blockchain network 102 can be comprised of a plurality of blockchain nodes 104. Each blockchain node 104 can be a computing system, such as illustrated in FIG. 2 or 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. In some embodiments, a listening system 108 can be a blockchain node 104.

The blockchain can be a distributed ledger that is comprised of at least a plurality of blocks. Each block can include at least a block header and one or more data values. Each block header can include at least a timestamp, a block reference value, and a data reference value. The timestamp can be a time at which the block header was generated and can be represented using any suitable method (e.g., UNIX timestamp, DateTime, etc.). The block reference value can be a value that references an earlier block (e.g., based on timestamp) in the blockchain. In some embodiments, a block reference value in a block header can be a reference to the block header of the most recently added block prior to the respective block. In an exemplary embodiment, the block reference value can be a hash value generated via the hashing of the block header of the most recently added block. The data reference value can similarly be a reference to the one or more data values stored in the block that includes the block header. In an exemplary embodiment, the data reference value can be a hash value generated via the hashing of the one or more data values. For instance, the block reference value can be the root of a Merkle tree generated using the one or more data values.

The use of the block reference value and data reference value in each block header can result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 104 in the blockchain network 102 prior to the generation and addition of a new block to the blockchain in order for the change to be made permanent. Computational and communication limitations can make such a modification exceedingly difficult, if not impossible, thus rendering the blockchain immutable.

In some embodiments, the blockchain can be used to store information regarding blockchain transactions conducted between two different blockchain wallets. A blockchain wallet can include a private key of a cryptographic key pair that is used to generate digital signatures that serve as authorization by a payer for a blockchain transaction, where the digital signature can be verified by the blockchain network 102 using the public key of the cryptographic key pair. In some cases, the term "blockchain wallet" can refer specifically to the private key. In other cases, the term "blockchain wallet" can refer to a computing device (e.g., participant devices 106, etc.) that stores the private key for use thereof in blockchain transactions. For instance, each computing device can each have their own private key for respective cryptographic key pairs and can each be a blockchain wallet for use in transactions with the blockchain associated with the blockchain network. Computing devices can be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain can correspond to a blockchain transaction or other storage of data, as applicable. A blockchain transaction can consist of at least: a digital signature of the sender of currency (e.g., a first participant device 106) that is generated using the sender's private key, a blockchain address of the recipient of currency (e.g., a second participant device 106) generated using the recipient's public key, and a blockchain currency amount that is transferred, or other data being stored. In some blockchain transactions, the transaction can also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction can also include the sender's public key, for use by an entity in validating the transaction. For the traditional processing of a blockchain transaction, such data can be provided to a blockchain node 104 in the blockchain network 102, either by the sender or the recipient. The node can verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block can be validated by other nodes in the blockchain network 102 before being added to the blockchain and distributed to all of the blockchain nodes 104 in the blockchain network 102, respectively, in traditional blockchain implementations. In cases where a blockchain data value cannot be related to a blockchain transaction, but instead the storage of other types of data, blockchain data values can still include or otherwise involve the validation of a digital signature.

The system 100 can include participant devices 106. Participant devices 106 can be computing devices that participate in the blockchain associated with the blockchain network 102, such as computing devices that have blockchain wallets and transfer digital currency from one participant device's blockchain wallet to another. Each transfer of digital currency between participant devices 106 can be stored in the blockchain via a blockchain transaction that is stored in a blockchain data value in the blockchain. Participant devices 106 can also participate in the blockchain via the submission of other data for storage in the blockchain, such as hash values for documents, storage of identity data for use in authentication, and other use cases that can be accomplished via an immutable, distributed storage.

In the system 100, the blockchain can be configured to store smart contracts. A smart contract can be a self-executable data object that is stored on the blockchain in a blockchain data value that executes once one or more criteria have been satisfied. The smart contract can monitor new blocks added to the blockchain until expected data is added to the blockchain that fulfills criteria or criteria is satisfied in another manner. Once the criteria is satisfied, the smart contract can self-execute and perform one or more actions related to the blockchain as a result, such as the submission of a new transaction for the transfer of digital currency or the submission of new data for storage in a new blockchain data value in the blockchain.

In an example, users of two different participant devices 106 can make a deal for the sale of a vehicle that is to be paid for using digital currency. The buyer can agree to pay a specific amount of digital currency, such as 500 units, that is to be paid upon delivery of the vehicle by the seller. In a traditional situation, the seller must give the vehicle to the buyer in the hope that the buyer will fulfill their end of the bargain with difficult recourse if the buyer does not satisfy payment. With smart contracts, a smart contract can be developed that will self-execute to add a new transaction to the blockchain for transfer of the 500 units of currency from the buyer's blockchain wallet to the seller's blockchain wallet. The criteria for the smart contract can be storage of a deed of transfer or other document on the blockchain. When the smart contract detects the document added to the blockchain, it can self-execute, and the seller is paid by the buyer. Using the smart contract, the buyer cannot prevent the transfer of currency if the seller fulfills the transfer. Likewise, the seller cannot force the transfer of currency without actually providing the buyer with documented ownership of the vehicle. The smart contract can also be developed such that, if storage of the document is not detected before a predetermined period of time, the smart contract expires, such as to ensure that the seller fulfills transfer of the vehicle in a timely fashion else the buyer retains control of their digital currency.

Traditionally, smart contracts can be useful tools for automatically performing actions related to a blockchain. However, in traditional blockchains smart contracts are limited to such actions and thus limit the ability for users to perform actions external to the blockchain as the result of activity that takes place on the blockchain. The system 100 provides an improvement over traditional blockchains through the use of emit functions in smart contracts.

In the system 100, a blockchain node 104 monitors the execution of smart contracts on the blockchain to detect the execution of an emit function. An emit function is a function that emit data that can be of any format and size that is desired by the developer of the smart contract that complies with any data requirements set forth for the blockchain itself. As discussed herein, such as function is described as an "emit" function, although any suitable name for the function can be used. When an emit function is executed in a smart contract, the data and values specified by the function are emitted and collected by a monitoring blockchain node 104. The blockchain node 104 collects this data, referred to herein as "event data," so denoted as the data is collected as the result of an event: the execution of the smart contract. In some cases, the collected event data can have additional data associated therewith by the blockchain node, such as a timestamp of collection, and identifier of the smart contract, an identifier of the blockchain data value or block where the executed smart contract is stored, etc. In other cases, the collected event data can be stored as a single set without additional information. In such cases, it can be up to the developer of the smart contract itself to include identifying information or other data in the emit function to be collected. For instance, a developer can include a unique reference number that they would understand in the emit function that is collected with other event data for later identification of the set of event data as desired.

An example emit function in a smart contract can be as follows:

```
function emitPayment (eventName: string, totals: uint,
    payment: micropayment.Payment): boolean {
    var map:Map=new Map( );
    var from:string=payment.from;
    var to:string=payment.to;
    var location:string=payment.location;
    var amount:uint=payment.amount;
    map.put ("eventName", eventName);
    map.put ("from", from);
    map.put("to", to);
    map.put("location", location);
    map.put ("amount," amount);
    emit(map);
    return true;
}
```

In the above example, the smart contract can result in the emitting of event data that includes a name (e.g., specified by the developer in the smart contract) and information regarding a payment on the smart contract (e.g., detected that resulted in execution of the smart contract) that includes information regarding the transferor, transferee, amount, and geographic location. In such an example, a user could use a unique event name to detect the event data later on, such as to detect when a desired blockchain transaction has occurred, with the to, from, amount, and location being used to confirm that the transaction is as desired.

The system 100 can include listening systems 108. A listening system 108 can subscribe to a blockchain node 104. As the result of a subscription, a listening system 108 can receive collected event data from a blockchain node 104 that is collected from all emit functions detected by the blockchain node 104. To subscribe, a listening system 108 can register with a blockchain node 104 and provide information regarding the collection of event data used by the blockchain node 104 to ensure distribution of the collected event data. Such information can include, for example, an e-mail address for distribution via e-mail, a telephone number for distribution via short messaging service messages, a username or other unique identifier for distribution via an application program or webpage, etc. In some cases, a listening system 108 can provide information for filtering of event data. For example, a listening system 108 can provide an identification value such as to subscribe to only sets of event data that includes the identification value, where the blockchain node 104 can distribute only sets of event data where the identification value is detected therein.

After a listening system 108 subscribes to a blockchain node 104, the blockchain node 104 can distribute collected event data to the listening system 108. In some cases, blockchain nodes 104 can distribute event data upon collection. In other words, after an emit function is detected and the event data therein collected, the blockchain node 104 can immediately distributed the collected event data to all subscribed listening systems 108. In other cases, a blockchain node 104 can distribute event data at predetermined periods of time. In some instances, the predetermined period of time can be set by the blockchain node 104. For example, a blockchain node 104 can distribute all collected event data on an hourly or daily basis, where all event data collected since the last distribution is distributed after the end of the next period. In other instances, a listening system 108 can specify when event data is to be distributed thereto. For example, during registration, a listening system 108 can specify a desire to have event data distributed thereto every four hours, where the blockchain node 104 can distribute all event data collected in each four-hour period to the listening system 108 upon expiration thereof.

Distribution of collected event data can include the transmission of all collected event data to a listening system 108 using a suitable communication network and method. In some cases, the collected event data can be compressed, encrypted, or otherwise modified prior to transmission, such as to suit the needs or requirements of a listening system 108 (e.g., as specified during registration). A listening system 108 can receive the collected event data and then feed the event data into a handler. A handler can be an application program or module that is configured to accept event data for analysis thereof and performing of additional functions. In some embodiments, a listening system 108 can be configured to filter or format event data prior to feeding the data to a handler, or the handler can be configured to filter or format event data prior to analysis and use. For instance, the listening system 108 can check each set of event data for a specific event name or other identifier and discard all sets of event data where no such value is found and feed any sets of event data that includes such a value to a handler for processing.

In an example, a buyer can be interested in purchasing a vehicle from a seller where proof of the transfer is to be stored on the blockchain for immutability and security, but where payment is desired to be made outside of the blockchain, such as via credit card, wire transfer, or other suitable transaction. In the example, a smart contract can be developed by a participant system (e.g., of one of the entities or an authorized third party) that detects addition of a deed of transfer on the blockchain. Once the deed is detected, the smart contract can self-execute, where self-execution includes the execution of an emit function that includes an identifier with a specific value and a copy of the detected deed. The identifier and deed can be collected by a blockchain node 104 as event data and distributed to a listening system 108, which can be utilized by one of the entities or an authorized third party. The listening system 108 can receive the event data and feed the data into a handler. The handler can analyze the event data and determine that when event data is received with that specific identifier, a deed should accompany the identifier, the deed should be verified that it matches and expected deed and, if verification is successful, an electronic payment transaction for payment of an agreed-upon amount of fiat currency is to be made from an account of the buyer to an account of the seller. As a result, the buyer and seller can have the sale of the car stored on the blockchain, but have payment satisfied using a transaction that occurs outside of the blockchain.

Accordingly, the methods and systems discussed herein provide for the execution of functions and actions outside of a blockchain as a result of actions taken on the blockchain itself. Using smart contracts and emit functions, data can be collected from smart contracts as a result of blockchain activity that is then provided to other systems, listening systems 108, for use for activity that takes place outside of the blockchain. This provides for a vast expansion of actions that can be undertaken by participants of a blockchain. Additionally, by utilizing smart contracts, the methods discussed herein can be accomplished without modification to existing blockchains and only requiring a blockchain node 104 to detect the execution of emit functions, which can be done to a single blockchain node 104 in a blockchain network 102 without affecting operation of the blockchain itself. Additionally, the use of emit functions that do not require specific values or formatting can enable a wide variety of use cases to fit the needs of participants. Thus, the methods and systems discussed herein provide for a significant improvement over existing systems with minimal onboarding and adjustment to existing processes.

Computing Device

FIG. 2 illustrates an embodiment of a computing device 200. It will be apparent to persons having skill in the relevant art that the embodiment of the computing device 200 illustrated in FIG. 2 is provided as illustration only and cannot be exhaustive to all possible configurations of the computing device 200 suitable for performing the functions as discussed herein. For example, the computer system 500 illustrated in FIG. 5 and discussed in more detail below can be a suitable configuration of the computing device 200. The computing device 200 discussed herein can be utilized as various components of the system 100, such as blockchain nodes 104 and listening systems 108.

The computing device 200 can include a receiving device 202. The receiving device 202 can be configured to receive data over one or more networks via one or more network protocols. In some instances, the receiving device 202 can be configured to receive data from other blockchain nodes 104, participant devices 106, listening systems 108, and other systems and entities via one or more communication methods, such as radio frequency, local area networks, wireless area networks, cellular communication networks, Bluetooth, the Internet, etc. In some embodiments, the receiving device 202 can be comprised of multiple devices, such as different receiving devices for receiving data over different networks, such as a first receiving device for receiving data over a local area network and a second receiving device for receiving data via the Internet. The receiving device 202 can receive electronically transmitted data signals, where data can be superimposed or otherwise encoded on the data signal and decoded, parsed, read, or otherwise obtained via receipt of the data signal by the receiving device 202. In some instances, the receiving device 202 can include a parsing module for parsing the received data signal to obtain the data superimposed thereon. For example, the receiving device 202 can include a parser program configured to receive and transform the received data signal into usable input for the functions performed by the processing device to carry out the methods and systems described herein.

The receiving device 202 can be configured to receive data signals electronically transmitted by blockchain nodes 104 that can be superimposed or otherwise encoded with blocks, blockchain data values, confirmation messages, cryptographic keys, collected event data, requests for preferences or registration information, etc. The receiving device 202 can also be configured to receive data signals electronically transmitted by participant devices 106, which can be superimposed or otherwise encoded with new blockchain transactions, new smart contracts, requests for blockchain data, registration information or preferences for distribution of event data, etc. The receiving device 202 can be further configured to receive data signals electronically transmitted by listening systems 108 that can be superimposed or otherwise encoded with registration information, preferences, requests for collected event data, distribution rules, etc.

The computing device 200 can also include a communication module 204. The communication module 204 can be configured to transmit data between modules, engines, databases, memories, and other components of the computing device 200 for use in performing the functions discussed herein. The communication module 204 can be comprised of one or more communication types and utilize various communication methods for communications within a computing device. For example, the communication module 204 can be comprised of a bus, contact pin connectors, wires, etc. In some embodiments, the communication module 204 can also be configured to communicate between internal components of the computing device 200 and external components of the computing device 200, such as externally connected databases, display devices, input devices, etc. The computing device 200 can also include a processing device. The processing device can be configured to perform the functions of the computing device 200 discussed herein as will be apparent to persons having skill in the relevant art. In some embodiments, the processing device can include and/or be comprised of a plurality of engines and/or modules specially configured to perform one or more functions of the processing device, such as a querying module 216, generation module 218, handler module 220, etc. As used herein, the term "module" can be software or hardware particularly programmed to receive an input, perform one or more processes using the input, and provides an output. The input, output, and processes performed by various modules will be apparent to one skilled in the art based upon the present disclosure.

The computing device 200 can include blockchain data 206. The blockchain data 206 can be configured to store data associated with a blockchain, which can include a blockchain wallet, blocks, cryptographic keys, data formatting rules, communication data, etc. In cases where the computing device 200 can be a listening system 108, the blockchain data 206 can also include data for use by a handler, filtering rules, formatting rules, etc. In cases where the computing device 200 can be a blockchain node 104, the blockchain data 206 can also include data used in the generation of new blockchain data values, generation of new blocks, confirmation of generated blocks, etc.

The computing device 200 can also include a memory 214. The memory 214 can be configured to store data for use by the computing device 200 in performing the functions discussed herein, such as public and private keys, symmetric keys, etc. The memory 214 can be configured to store data using suitable data formatting methods and schema and can be any suitable type of memory, such as read-only memory, random access memory, etc. The memory 214 can include, for example, encryption keys and algorithms, communication protocols and standards, data formatting standards and protocols, program code for modules and application programs of the processing device, and other data that can be suitable for use by the computing device 200 in the performance of the functions disclosed herein as will be apparent to persons having skill in the relevant art. In some embodiments, the memory 214 can be comprised of or can otherwise include a relational database that utilizes structured query language for the storage, identification, modifying, updating, accessing, etc. of structured data sets stored therein. The memory 214 can be configured to store, for example, cryptographic keys, cryptographic key pairs, cryptographic algorithms, encryption algorithms, communication information, data formatting rules, signature generation algorithms, subscriber information, collected event data, event data filtering and formatting rules, handler program code, etc.

The computing device 200 can include a querying module 216. The querying module 216 can be configured to execute queries on databases to identify information. The querying module 216 can receive one or more data values or query strings and can execute a query string based thereon on an indicated database, such as the memory 214 of the computing device 200 to identify information stored therein. The querying module 216 can then output the identified information to an appropriate engine or module of the computing device 200 as necessary. The querying module 216 can, for example, execute a query on the memory 214 to identify communication information for currently subscribed listening systems 108 for distributing collected event data.

The computing device 200 can also include a generation module 218. The generation module 218 can be configured to generate data for use by the computing device 200 in performing the functions discussed herein. The generation module 218 can receive instructions as input, can generate data based on the instructions, and can output the generated data to one or more modules of the computing device 200. For example, the generation module 218 can be configured to generate blockchain data entries, blocks, confirmation messages, cryptographic key pairs, digital signatures, functions and instructions for performing actions, etc.

The computing device 200 can also include a handler module 220. The handler module 220 can be configured to analyze collected event data and perform or initiate one or more actions as a result thereof. The handler module 220 can receive collected event data as input, which can also include data to be used in analyzing the event data, such as filtering or formatting rules, can perform process the collected event data as requested, and can initiate or perform one or more actions as a result, which can include the transmission of instructions or other data to another module or engine of the computing device 200. The handler module 220 can, for example, be configured to process collected event data to determine one or more actions that need to be performed based on values in the collected event data and initiate the action(s).

The computing device 200 can also include a transmitting device 222. The transmitting device 222 can be configured to transmit data over one or more networks via one or more network protocols. In some instances, the transmitting device 222 can be configured to transmit data to other blockchain nodes 104, participant devices 106, listening systems 108, and other entities via one or more communication methods, local area networks, wireless area networks, cellular communication, Bluetooth, radio frequency, the Internet, etc. In some embodiments, the transmitting device 222 can be comprised of multiple devices, such as different transmitting devices for transmitting data over different networks, such as a first transmitting device for transmitting data over a local area network and a second transmitting device for transmitting data via the Internet. The transmitting device 222 can electronically transmit data signals that have data superimposed that can be parsed by a receiving computing device. In some instances, the transmitting device 222 can include one or more modules for superimposing, encoding, or otherwise formatting data into data signals suitable for transmission.

The transmitting device 222 can be configured to electronically transmit data signals to blockchain nodes 104 that can be superimposed or otherwise encoded with blockchain data values, blocks, confirmation messages, requests for blockchain data, subscriber registration information, subscriber criteria, requests for collected event data, etc. The transmitting device 222 can also be configured to electronically transmit data signals to participant devices 106, which can be superimposed or otherwise encoded with blockchain data, blocks, blockchain data values, identifiers for new blockchain transactions, requests for digital signatures or cryptographic keys, etc. The transmitting device 222 can be further configured to electronically transmit data signals to listening systems 108 that can be superimposed or otherwise encoded with requests for registration information or criteria, collected event data, blockchain data, etc.

Process for Distributing and Using Event Data from Smart Contracts

Figure 3:
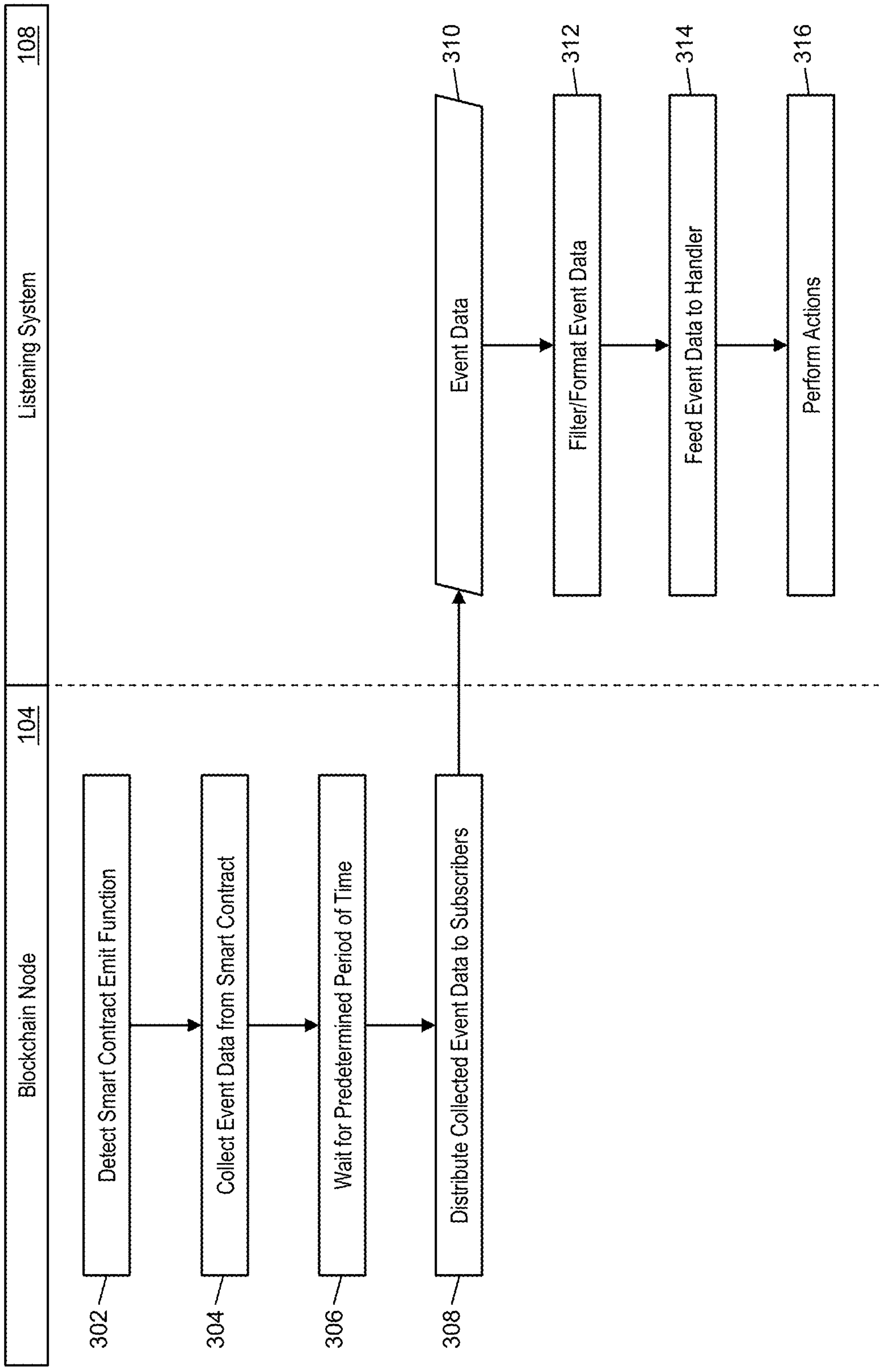
FIG. 3 is a flow diagram illustrating a process for distributing and using event data for smart contracts in the system of FIG. 1 in accordance with exemplary embodiments.

FIG. 3 illustrates a process for the collection of event data emitted from an executed smart contract on a blockchain and use thereof to perform one or more actions external to the blockchain.

In step 302, a blockchain node 104 in the blockchain network 102 can detect an emit function being executed by a smart contract that is stored on the blockchain and executed. To detect the emit function, the receiving device 202 of the blockchain node 104 can receive data generated or transmitted by the smart contract and a processor of the blockchain node 104 can identify an emit function in the data. In step 304, the blockchain node 104 can collect event data that is output as a result of the detected emit function, where the event data can be of any suitable size or format and include any number and format of data values therein. In step 306, the blockchain node 104 can temporarily store the event data, such as in a memory 214 of the blockchain node 104, while waiting for a predetermined period of time, such as set by the blockchain node 104 itself or as requested by a listening system 108 to which the collected event data is to be distributed.

Once the predetermined period of time has expired, then, in step 308, the transmitting device 222 of the blockchain node 104 can electronically transmit the collected event data, as well as any other event data collected since the last distribution, to a subscribed listening system 108 using a suitable communication network and method. In step 310, a receiving device 202 of the listening system 108 can receive the collected event data. In step 312, a generation module 218 or other suitable module or engine of the listening system 108 can filter and/or format the received event data as applicable. For example, the listening system 108 can filter the event data by discarding all collected event data that doesn't include a specific data value (e.g., an identifier field with a specific identification number) and can format any non-discarded data, such as decrypting the data using a suitable decryption key.

In step 314, the listening system 108 may input the filtered and formatted event data into a handler module 220. The handler module can analyze the data using any specific program code, rules, etc. and, in step 316, perform one or more actions as a result. In an exemplary embodiment, the one or more actions may be external to the blockchain. In examples, the one or more actions can include an electronic payment transaction using fiat currency, the transfer of data to an external computing system, the execution of an application program, the modification to the configuration of a computing device, etc.

Exemplary Method for Distributing Event Data

Figure 4:
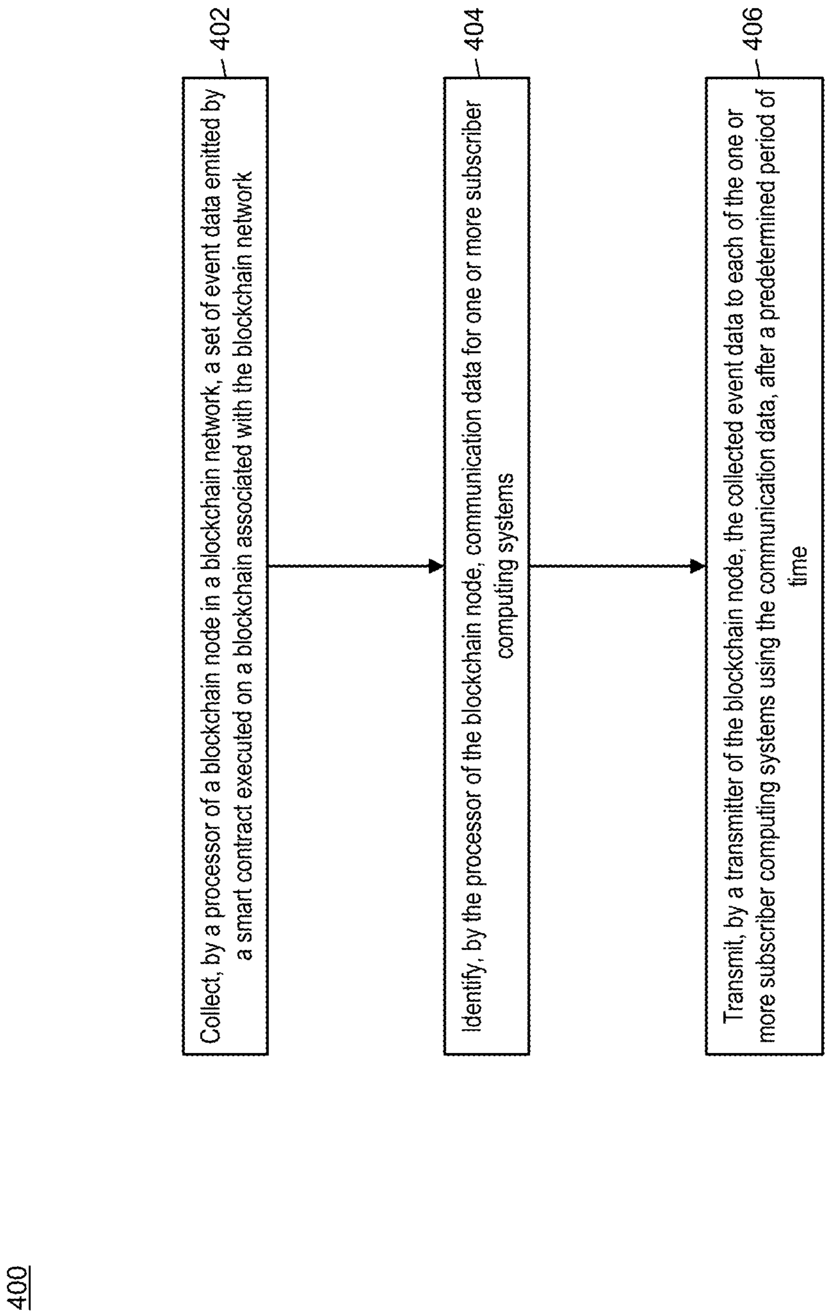
FIG. 4 is a flow chart illustrating an exemplary method for distributing event data for smart contracts in accordance with exemplary embodiments.

FIG. 4 illustrates a method 400 for distributing event data for smart contracts executed on a blockchain to subscribing systems.

In step 402, a set of event data emitted by a smart contract executed on a blockchain that is associated with a blockchain network (e.g., blockchain network 102) can be collected by a processor of a blockchain node (e.g., blockchain node 104) in the blockchain network. In step 404, communication data for one or more subscriber computing systems (e.g., listening systems 108) can be identified by the processor (e.g., querying module 218) of the blockchain node. In step 406, the collected event data can be transmitted by a transmitter (e.g., transmitting device 222) of the blockchain node to each of the one or more subscriber computing systems using the communication data, after a predetermined period of time.

In one embodiment, the method 400 can further include receiving, by a receiver (e.g., receiving device 202) of the blockchain node, a new block for the blockchain, wherein the smart contract self-executes after receipt of the new block. In some embodiments, the predetermined period of time can be specified in the smart contract. In one embodiment, the predetermined period of time can be based on storing, by the processor of the blockchain node, of a block in the blockchain comprising the smart contract.

In some embodiments, the smart contract can include an emit function, and the event data collected by the blockchain node can be specified in the emit function. In one embodiment, the method 400 can further include collecting, by the processor of the blockchain node, a second set of event data emitted by a second smart contract executed on the blockchain, wherein the collected second set of event data is transmitted to each of the one or more subscriber computing systems if collected prior to expiration of the predetermined period of time. In some embodiments, the blockchain node does not store the collected event data in the blockchain node or storage media accessible by the blockchain node. In one embodiment, each of the one or more subscriber computing systems are not blockchain nodes in the blockchain network.

Computer System Architecture

FIG. 5 illustrates a computer system 500 in which embodiments of the present disclosure, or portions thereof, can be implemented as computer-readable code. For example, the blockchain nodes 104, participant devices 106, and listening system 108 of FIG. 1 and the computing device 200 of FIG. 2 can be implemented in the computer system 500 using hardware, non-transitory computer readable media having instructions stored thereon, or a combination thereof and can be implemented in one or more computer systems or other processing systems. Hardware can embody modules and components used to implement the methods of FIGS. 3 and 4.

If programmable logic is used, such logic can execute on a commercially available processing platform configured by executable software code to become a specific purpose computer or a special purpose device (e.g., programmable logic array, application-specific integrated circuit, etc.). A person having ordinary skill in the art can appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, at least one processor device and a memory can be used to implement the above-described embodiments.

A processor unit or device as discussed herein can be a single processor, a plurality of processors, or combinations thereof. Processor devices can have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

Processor device 504 can be a special purpose or a general-purpose processor device specifically configured to perform the functions discussed herein. The processor device 504 can be connected to a communications infrastructure 506, such as a bus, message queue, network, multi-core message-passing scheme, etc. The network can be any network suitable for performing the functions as disclosed herein and can include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 can also include a main memory 508 (e.g., random access memory, read-only memory, etc.), and can also include a secondary memory 510. The secondary memory 510 can include the hard disk drive 512 and a removable storage drive 514, such as a floppy disk drive, a magnetic tape drive, an optical disk drive, a flash memory, etc.

The removable storage drive 514 can read from and/or write to the removable storage unit 518 in a well-known manner. The removable storage unit 518 can include a removable storage media that can be read by and written to by the removable storage drive 514. For example, if the removable storage drive 514 is a floppy disk drive or universal serial bus port, the removable storage unit 518 can be a floppy disk or portable flash drive, respectively. In one embodiment, the removable storage unit 518 can be non-transitory computer readable recording media.

In some embodiments, the secondary memory 510 can include alternative means for allowing computer programs or other instructions to be loaded into the computer system 500, for example, the removable storage unit 522 and an interface 520. Examples of such means can include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) can be stored on any type of suitable computer readable media, such as optical storage (e.g., a compact disc, digital versatile disc, Blu-ray disc, etc.) or magnetic tape storage (e.g., a hard disk drive). The data can be configured in any type of suitable database configuration, such as a relational database, a structured query language (SQL) database, a distributed database, an object database, etc. Suitable configurations and storage types will be apparent to persons having skill in the relevant art.

The computer system 500 can also include a communications interface 524. The communications interface 524 can be configured to allow software and data to be transferred between the computer system 500 and external devices. Exemplary communications interfaces 524 can include a modem, a network interface (e.g., an Ethernet card), a communications port, a PCMCIA slot and card, etc. Software and data transferred via the communications interface 524 can be in the form of signals, which can be electronic, electromagnetic, optical, or other signals as will be apparent to persons having skill in the relevant art. The signals can travel via a communications path 526, which can be configured to carry the signals and can be implemented using wire, cable, fiber optics, a phone line, a cellular phone link, a radio frequency link, etc.

The computer system 500 can further include a display interface 502. The display interface 502 can be configured to allow data to be transferred between the computer system 500 and external display 530. Exemplary display interfaces 502 can include high-definition multimedia interface (HDMI), digital visual interface (DVI), video graphics array (VGA), etc. The display 530 can be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium can refer to memories, such as the main memory 508 and secondary memory 510, which can be memory semiconductors (e.g., DRAMs, etc.). These computer program products can be means for providing software to the computer system 500. Computer programs (e.g., computer control logic) can be stored in the main memory 508 and/or the secondary memory 510. Computer programs can also be received via the communications interface 524. Such computer programs, when executed, can enable computer system 500 to implement the present methods as discussed herein. In particular, the computer programs, when executed, can enable processor device 504 to implement the methods illustrated by FIGS. 3 and 4, as discussed herein. Accordingly, such computer programs can represent controllers of the computer system 500. Where the present disclosure is implemented using software, the software can be stored in a computer program product and loaded into the computer system 500 using the removable storage drive 514, interface 520, and hard disk drive 512, or communications interface 524.

The processor device 504 can comprise one or more modules or engines configured to perform the functions of the computer system 500. Each of the modules or engines can be implemented using hardware and, in some instances, can also utilize software, such as corresponding to program code and/or programs stored in the main memory 508 or secondary memory 510. In such instances, program code can be compiled by the processor device 504 (e.g., by a compiling module or engine) prior to execution by the hardware of the computer system 500. For example, the program code can be source code written in a programming language that is translated into a lower level language, such as assembly language or machine code, for execution by the processor device 504 and/or any additional hardware components of the computer system 500. The process of compiling can include the use of lexical analysis, preprocessing, parsing, semantic analysis, syntax-directed translation, code generation, code optimization, and any other techniques that can be suitable for translation of program code into a lower-level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for distributing event data for smart contracts executed on a blockchain to subscribing systems. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or can be acquired from practicing of the disclosure, without departing from the breadth or scope.

What is claimed is:

1. A method for distributing event data for smart contracts executed on a blockchain to subscribing systems, comprising:

monitoring, by a processor of a blockchain node in a blockchain network, an execution of a smart contract to detect execution of an emit function;

collecting, by the processor of the blockchain node, a first set of event data that is (i) specified by the emit function and (ii) emitted by the smart contract executed on a blockchain associated with the blockchain network;

identifying, by the processor of the blockchain node, communication data for one or more subscriber computing systems that are external to the blockchain network; and after expiration of a predetermined period of time, transmitting, by a transmitter of the blockchain node, the collected first set of event data to each of the one or more subscriber computing systems using the communication data.

2. The method of claim 1, further comprising:

receiving, by a receiver of the blockchain node, a new block for the blockchain, wherein the smart contract self-executes after receipt of the new block.

3. The method of claim 1, further comprising:

collecting, by the processor of the blockchain node, a second set of event data emitted by a second smart contract executed on the blockchain, wherein the collected second set of event data is transmitted to each of the one or more subscriber computing systems if collected prior to expiration of the predetermined period of time.

4. The method of claim 1, wherein the blockchain node does not store the collected event data in the blockchain node or storage media accessible by the blockchain node.

5. The method of claim 1, wherein each of the one or more subscriber computing systems are not blockchain nodes in the blockchain network.

6. A system for distributing event data for smart contracts executed on a blockchain to subscribing systems, comprising:

a blockchain network including a blockchain node; and one or more subscriber computing systems that are external to the blockchain network, wherein the blockchain node includes a processor monitoring an execution of a smart contract to detect execution of an emit function;

collecting a first set of event data that is (i) specified by the emit function and (ii) emitted by the smart contract executed on a blockchain associated with the blockchain network, and identifying communication data for the one or more subscriber computing systems, and a transmitter transmitting, after expiration of a predetermined period of time, the collected first set of event data to each of the one or more subscriber computing systems using the communication data.

7. The system of claim 6, wherein the blockchain node further includes a receiver receiving a new block for the blockchain, wherein the smart contract self-executes after receipt of the new block.

8. The system of claim 6, wherein the processor of the blockchain node further collects a second set of event data emitted by a second smart contract executed on the blockchain, and the collected second set of event data is transmitted to each of the one or more subscriber computing systems if collected prior to expiration of the predetermined period of time.

9. The system of claim 6, wherein the blockchain node does not store the collected event data in the blockchain node or storage media accessible by the blockchain node.

10. The system of claim 6, wherein each of the one or more subscriber computing systems are not blockchain nodes in the blockchain network.

11. A method for distributing event data for smart contracts executed on a blockchain to subscribing systems, comprising:

collecting, by a processor of a blockchain node in a blockchain network, a first set of event data that is (i) specified by an emit function and (ii) emitted by a smart contract executed on a blockchain associated with the blockchain network, wherein the smart contract specifies a predetermined period of time that stipulates when the event data is to be distributed;

identifying, by the processor of the blockchain node, communication data for one or more subscriber computing systems that are external to the blockchain network; and after expiration of the predetermined period of time specified in the smart contract, transmitting, by a transmitter of the blockchain node, the collected first set of event data to each of the one or more subscriber computing systems using the communication data.

12. The method of claim 11, further comprising:

receiving, by a receiver of the blockchain node, a new block for the blockchain, wherein the smart contract self-executes after receipt of the new block.

13. The method of claim 11, further comprising:

collecting, by the processor of the blockchain node, a second set of event data emitted by a second smart contract executed on the blockchain, wherein the collected second set of event data is transmitted to each of the one or more subscriber computing systems if collected prior to expiration of the predetermined period of time.

14. A system for distributing event data for smart contracts executed on a blockchain to subscribing systems, comprising:

a blockchain network including a blockchain node; and one or more subscriber computing systems that are external to the blockchain network, wherein the blockchain node includes a processor collecting a first set of event data that is (i) specified by an emit function and (ii) emitted by a smart contract executed on a blockchain associated with the blockchain network, wherein the smart contract specifies a predetermined period of time that stipulates when the event data is to be distributed, and identifying communication data for the one or more subscriber computing systems, and a transmitter transmitting, after expiration of the predetermined period of time specified in the smart contract, the collected first set of event data to each of the one or more subscriber computing systems using the communication data.

15. The system of claim 14, wherein the blockchain node further includes a receiver receiving a new block for the blockchain, wherein the smart contract self-executes after receipt of the new block.

16. The system of claim 14, wherein the processor of the blockchain node further collects a second set of event data emitted by a second smart contract executed on the blockchain, and the collected second set of event data is transmitted to each of the one or more subscriber computing systems if collected prior to expiration of the predetermined period of time.

* * * * *